United States Patent
Berktold et al.

(10) Patent No.: US 6,918,716 B2
(45) Date of Patent: Jul. 19, 2005

(54) INTERNAL BROACH

(75) Inventors: Andreas Berktold, Neuss (DE); Norbert Weghaus, Burscheid (DE)

(73) Assignee: Forst Technologie GmbH & Co. KG, Solingen (DE)

( * ) Notice: Subject to any disclaimer, the term of this patent is extended or adjusted under 35 U.S.C. 154(b) by 0 days.

(21) Appl. No.: 10/310,067

(22) Filed: Dec. 5, 2002

(65) Prior Publication Data

US 2003/0103817 A1 Jun. 5, 2003

(30) Foreign Application Priority Data

Dec. 5, 2001 (DE) .......................... 101 59 532

(51) Int. Cl.⁷ .............................................. B23P 15/42
(52) U.S. Cl. ........................................ 407/18; 407/13
(58) Field of Search ............................ 407/13, 18, 19; 409/259, 260, 261

(56) References Cited

U.S. PATENT DOCUMENTS

| | | | |
|---|---|---|---|
| 1,713,390 A | * | 5/1929 | Lundell ..................... 407/18 |
| 2,683,919 A | | 7/1954 | Psenka |
| 2,898,670 A | | 8/1959 | Pernack |
| 5,503,506 A | * | 4/1996 | Yuan ........................... 407/13 |
| 5,865,569 A | * | 2/1999 | Holstein et al. ............. 407/13 |
| 6,409,442 B1 | * | 6/2002 | Berktold et al. ........... 409/269 |

FOREIGN PATENT DOCUMENTS

JP 9 234627 9/1997

* cited by examiner

Primary Examiner—Willmon Fridie, Jr.
(74) Attorney, Agent, or Firm—Browdy & Neimark, P.L.L.C.

(57) ABSTRACT

An internal broach for internally broaching profiles, defined by a bottom and flanks, of female serrations of a work piece, comprises a toothed portion with several rows of broach cutting teeth disposed successively counter to a direction of broaching, successive broach cutting teeth being allocated to each other for broaching a profile. The broach cutting teeth have bottom cutting blades and first and second sides. The first sides are guide flanks, the edges of which are guide edges without cutting ability. The second sides are flank-cutting-blade relief surfaces, the edges of which are designed as flank blades with cutting ability.

9 Claims, 6 Drawing Sheets

INTERNAL BROACH

BACKGROUND OF THE INVENTION

1. Field of the Invention

The invention relates to an internal broach for internally broaching profiles defined by a bottom and flanks, in particular female serrations, in a work piece, which broach comprises a shank, which leads in a direction of broaching; and a toothed section with several rows of broach cutting teeth, the rows being disposed successively counter to the direction of broaching; wherein broach cutting teeth are allocated to each other for broaching a profile of a depth; wherein the broach cutting teeth have bottom cutting blades and first and second sides; wherein the bottom cutting blades of successive and associated broach cutting teeth have a pitch a relative to the broach cutting teeth which lead in the direction of broaching; wherein a bottom-cutting-blade relief surface is allocated to the bottom cutting blades; and wherein the first and second sides pass through the bottom-cutting-blade relief surfaces, forming first and second edges.

2. Background Art

The internal broaches conventionally used for internal profile broaching are known from DIN 1415 (ed. 1973), sheet 1, page 2. They have a shank, a toothed section and a tail end. The shank is held by a broaching machine puller, which pulls the broach through a work piece held in the broaching machine, broaching the profiles in doing so. After the broaching operation, the tail end is seized by a retriever of the broaching machine, which returns the broach after the broaching operation into its initial position. Counter to the direction of broaching, the toothed section comprises several rows of broach cutting teeth, as a rule a great number of these rows of broach cutting teeth. The broach cutting teeth have blades for cutting the bottom of a profile and blades for cutting the flanks of the profile. The broach cutting teeth are disposed successively counter to the direction of broaching and are allocated to each other in this regard, serving to machine a profile; they are progressively stepped in depth i.e., they have a diametric pitch, so that all the broach cutting teeth that serve for machining a profile will successively cut a chip serving to produce the bottom of a profile.

Since the main machining operation is delivered by the bottom cutting blades, they are also called primary blades. For machining the flanks of a profile, the broach cutting teeth, which are disposed successively counter to the direction of broaching, have flank cutting blades of a back taper as illustrated in DIN 1415 (ed. 1973), sheet 1, page 3, picture 11. The flank cutting blades are also called secondary blades. The back taper is produced by the flank cutting blades of a subsequent tooth being relieved laterally as compared to the flank cutting blades of a leading tooth, so that the flank cutting blades of a subsequent tooth only machine the area provided by diametric pitch or back taper, and do not engage with the work piece in the area where the flank cutting blades of the leading tooth have machined. This helps prevent the broach cutting teeth from being clamped in the vicinity of the profile flanks during the broaching operation. The result is a stepped surface structure of the profile flanks.

The profiles produced by a familiar and customary internal broach have sufficient surface quality, accuracy of profile shape and flank curve for standard applications and requirements. During the broaching operation, displacement of the axis of the broach may occur so that each of the successively engaging teeth has a varying center position relative to the work piece that is to be machined. In particular in the case of twist broaching (helical broaching), torsional deviation may be superimposed on such a displacement of the axis of the broach; the torsional deviation is caused by rotatory forces during twist broaching. Very often, profile accuracy and flank surface quality are not sufficient in this case, flank curve accuracy being satisfactory as a rule. High accuracy of profile shape and flank curve are demanded in particular in the case of running gears such as female serrated gears with spur teeth or helical teeth.

In order to remedy the mentioned deficiencies in the case of correspondingly high demands, it has been familiar practice to provide the broach with a sizing section downstream of the back-tapered broach cutting teeth—seen in the direction of broaching. Such a sizing section comprises several successive broach cutting teeth of identical height, which do not regroove the bottom of the profile. However, they have tooth thicknesses that increase counter to the direction of broaching i.e., all the sizing teeth cut a chip over the full height of the profile flank, the chip thickness generally being 10 to 20 $\mu$m. Each flank cutting blade of the sizing teeth must have a relief produced by grinding i.e., it must have a relief angle. They are relief-ground. Sizing helps obtain excellent accuracy of profile shape and high surface quality. Flank curve accuracy deteriorates as compared to the profile broached by progressive stepping. This is due to the fact that the relief-ground flank cutting blades of the sizing teeth are sharp cutting edges of comparatively bad self-guidance behavior.

It is inherent in the system that any changeover from a progressively stepped broaching operation to full form sizing is accompanied with a break in the broaching force, which leads to considerable drawbacks, in particular in the case of twist broaching. Relieving the main cutting force that acts counter to the direction of broaching will lead to a reduction in torsional stress i.e., the torsion of the work piece relative to the internal broach changes. This change may be sufficiently strong so that the full form sizing section is not led correctly into the progressively broached profiles and, as a result, machines the flanks unilaterally so that the profile is not sized on both flanks. Owing to the mentioned deficiencies of the profile produced by progressively stepped broaching, the flank cutting blades of the broach cutting teeth will cut irregularly into the stepped flanks of the profile, with torsional vibrations originating which may negatively affect flank curve accuracy.

U.S. Pat. No. 2,986,801 teaches an internal broach for internally broaching female serrations, which are defined by a bottom and flanks, in a work piece. The bottom cutting blades of successive and associated broach cutting teeth have a positive diametrical pitch as compared to the broach cutting teeth that lead in the direction of broaching. The flank cutting blades of successive and associated broach cutting teeth have a negative diametrical pitch over their full height. This means that the contours of successive broach cutting teeth narrow as the diameter grows. The resulting drawbacks correspond to the drawbacks specified above in connection with DIN 1415 (ed. 1973).

For elimination of the above-mentioned drawbacks in an internal broach, U.S. Pat. No. 5,865,569 teaches to obtain improved surface quality and accuracy of profile shape and flank curves in that the flank cutting blades of successive and associated broach cutting teeth, over their full height, have a pitch that is small relative to the diametrical pitch of the bottom cutting blades. In this known embodiment, the chip space bottom of the broach cutting teeth must be below the web of the profile i.e., below the top circle of the profile that is to be produced, because all the flank cutting blades are defined downwardly by the web of the profile. In the case of great height of the profiles that are to be produced, this will lead to wide spacings of teeth, which has the consequence that, with a given number of broach cutting teeth, the broach becomes too long. If however the spacing of teeth is reduced in spite of too great a height of the profile that is to be produced, this may lead to grinding problems. Within certain dimensional ranges of the profiles, exploiting the advantages of the design of the generic type will therefore be restricted. In particular in the case of twist broaching, the use of these broaches requires broaching machines or high rigidity and accurate twist actuation.

SUMMARY OF THE INVENTION

It is an object of the invention to embody an internal broach of the generic type such that the profile that is factually produced exactly corresponds to the desired profile.

According to the invention, this object is attained by the features wherein the first sides are guide flanks, with the first edges being guide edges without cutting ability; and wherein the second sides, at least in proximity to bottom cutting blades, are flank-cutting-blade relief surfaces, the second edges, by allocation to the bottom cutting blades, being flank cutting blades with cutting ability. In the internal broach according to the invention, guidance takes place exclusively on one side of the broach cutting teeth i.e., no profile flank chip is machined. However, shaping of the chip that is cut by the bottom cutting blade i.e., the primary blade, takes place also in the vicinity of the guide edge to the extent it extends over the pitch of the profile. A chip can be cut on the opposite flank of the profile to be produced. It is of decisive importance that the guide flanks of the broach are pressed in one and the same direction against the flanks of the profile that have the final shape. Some minor pitch of the flank cutting blades can be reasonable for pressure to be exercised on the guide flank. This is of no substantial importance in the case of twist broaching where the guide flank is the lagging flank—referred to the direction of twisting—the so-called pressure flank. The cutting ability of the flank cutting blades helps prevent the broach from being clamped. The mentioned drawbacks do not occur. The flank that the respective broach cutting tooth passes along has the desired final quality after termination of the broaching job, whereas in numerous embodiments the other flank still has be finished to size.

Further features, advantages and details of the invention will become apparent from the ensuing description, taken in conjunction with the drawing.

DESCRIPTION OF THE PREFERRED EMBODIMENTS

Figure 1:
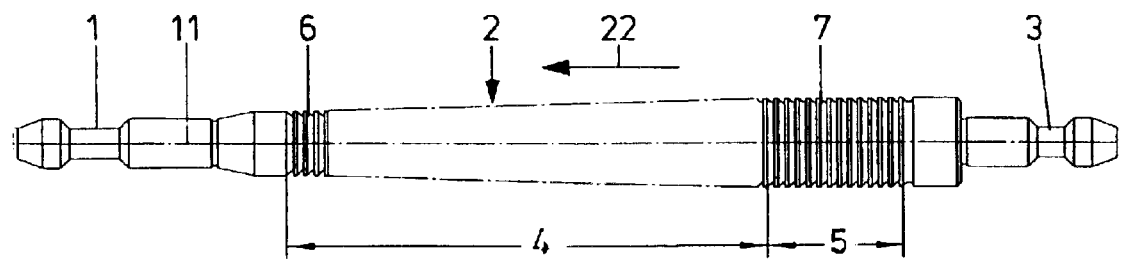
FIG. 1 is an illustration of an internal broach.

The internal broach seen in FIG. 1, the fundamental structure of which is familiar, comprises a shank 1, a toothed section 2 and a tail end 3 subsequent thereto. The toothed section 2 includes a broaching portion 4 subsequent to the shank 1 and an adjoining sizing portion 5 upstream of the tail end 3. The broaching portion 4 has several rows 6 of broach cutting teeth that will be explained below. The sizing portion 5 also includes a number of rows 7 of sizing teeth.

Figure 2:
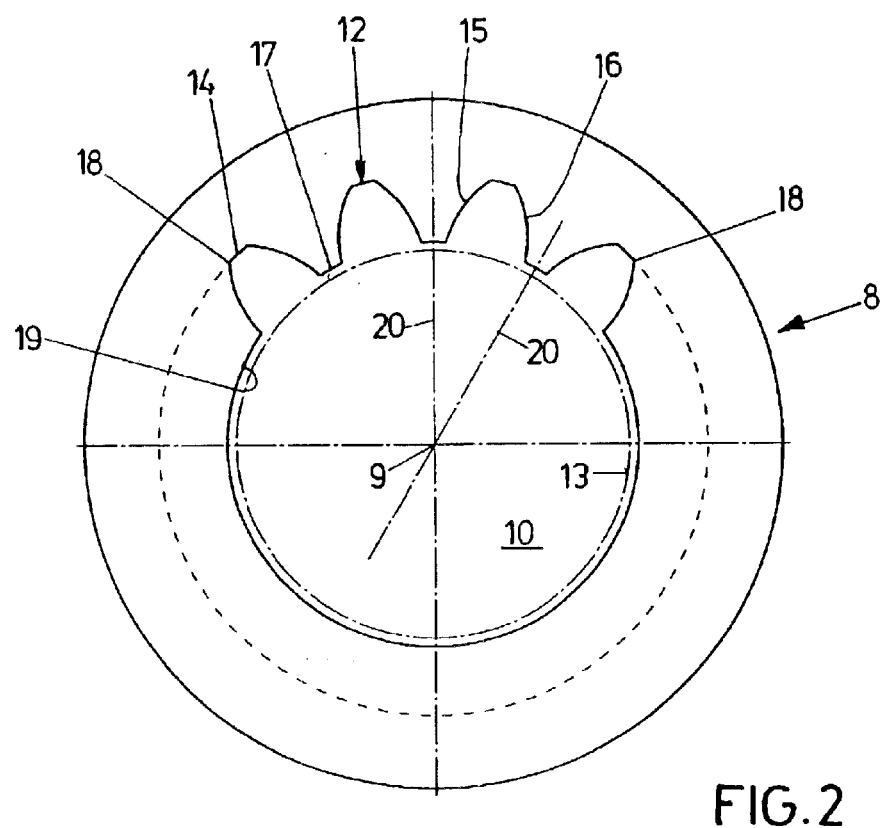
FIG. 2 is an illustration of a work piece that is provided with profiles in the form of a female serration.

The broach serves to machine for instance an annular work piece 8 which is illustrated in FIG. 2. Prior to being broached, it has a borehole 10 concentric of the central longitudinal axis 9 of the finished work piece 8. The work piece 8 is placed on a work piece support of an internal broaching machine; then the shank 1 of the broach is led through the borehole 10 and seized by a puller of the broaching machine, the puller being drivable in the direction of the axis 11 of the broach, drawing the broach through the work piece 8. In doing so, profiles 12, for instance female serrations, are broached into the internal circumference 13 of the work piece 8. The internal broach is not positively guided, there being self-guidance and self-centering between the work piece 8 and the broach i.e., there is the fundamental requirement that the axis 11 of the broach and the axis 9 of the work piece 8 coincide. The tail end 3 primarily serves to return the internal broach after a broaching stroke. The broach can be employed not only on pull broaching machines, but on so-called lifting-table broaching machines as well as on push broaching machines.

The profiles 12 to be broached have a bottom 14, two opposite flanks 15, 16 and a web 17 that joins to each other the neighboring flanks 15, 16 of two neighboring profiles 12. The flanks 15, 16 of a profile 12 combine with the bottom 14 to form a corner 18. When the profiles 12 are broached, the borehole 10 can be widened, forming a recess 19 defined by the webs 17. The following does not deal with explaining the job of broaching the work piece 8 in the vicinity of the webs 17 that are to be produced, this being of no relevance to the understanding of the invention. The following deals with a profile 12 broaching operation in which the profile 12 is disposed between two radiuses 20 through the axis 9 that bisect webs 17 that adjoin the profile 12.

Figure 5:
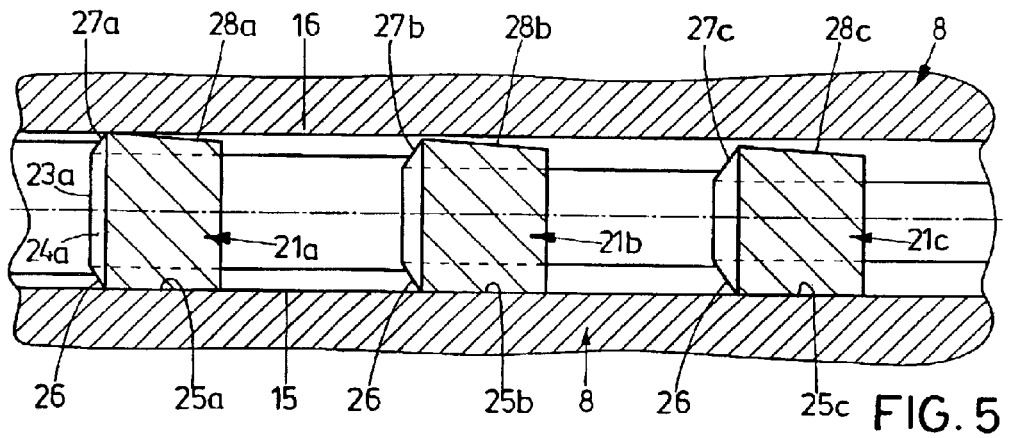
FIG. 5 is a partial cross section of the first embodiment on the line V—V of FIG. 4.
Figure 4:
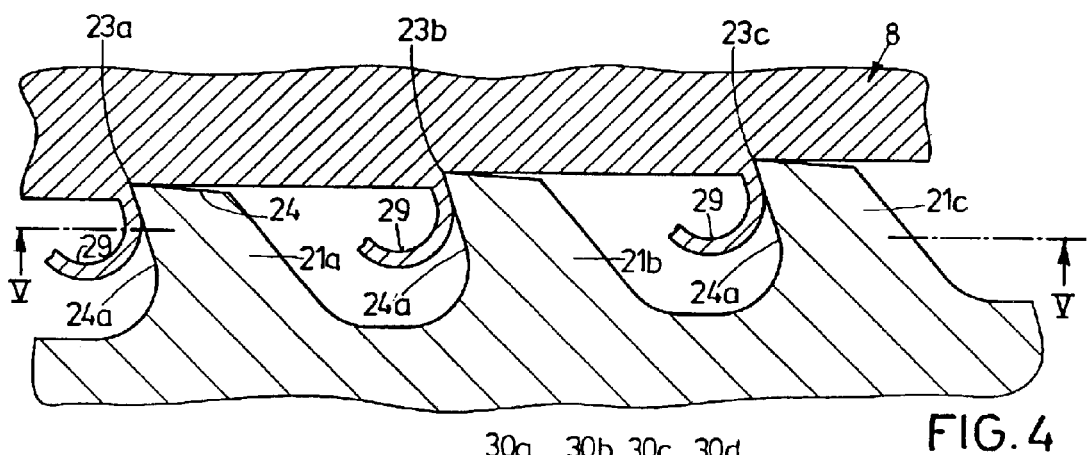
FIG. 4 is a partial longitudinal section of the first embodiment.
Figure 3:
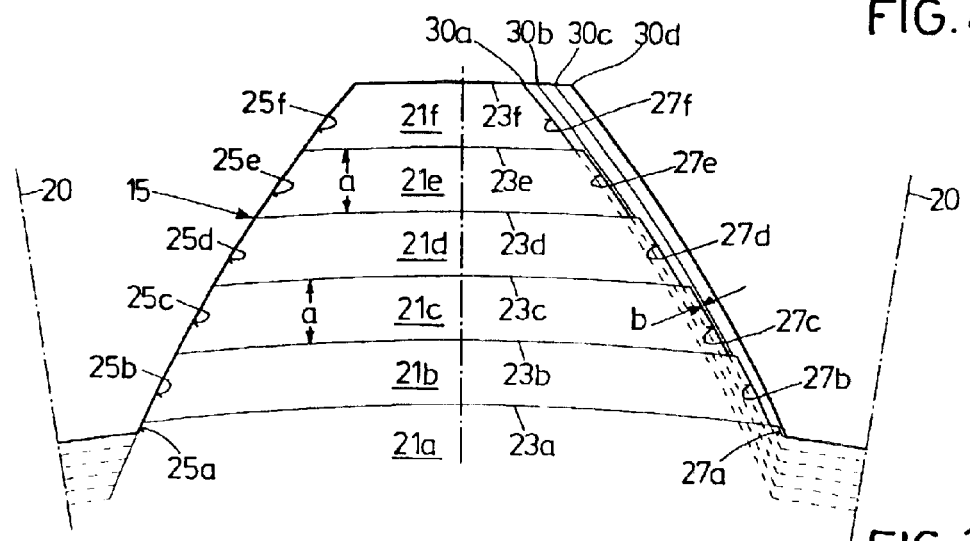
FIG. 3 is a partial cross-section of a first embodiment of a broach in engagement with the work piece.

A first exemplary embodiment, according to the invention, of an internal broach according to FIGS. 3 to 5 comprises broach cutting teeth 21, a first tooth of which being designated by 21a, further teeth by 21b, 21c, 21d, 21e, and a last tooth by 21f. Even if only a total of six broach cutting teeth 21 are illustrated, at least five to twenty times the number of teeth—depending on the depth of profile to be produced—are available in practice in the broaching portion 4 of a broach. The broach cutting teeth 21a to 21f are arranged on the broach counter to the direction of broaching 22. The broach cutting teeth 21a to 21f each have a bottom cutting blade 23a to 23f, called primary blade in practice, which extends in the course of a circle that is concentric of the axis 11. The bottom cutting blades 23a to 23f are customarily provided with a relief produced by grinding i.e., a relief angle. They have a bottom cutting blade relief surface 24 and a machining surface 24a, as seen in FIGS. 4 and 5.

The sides of the broach cutting teeth 21 that are allocated to the flanks 15, 16 of the work piece 8, which are to be produced, vary in design. The sides of the broach cutting teeth 21a to 21f that are allocated to a flank 15—on the left in FIG. 3—are pure guide flanks 25a to 25f. Over the full flank height, their course corresponds to the course of the flank 15 that is to be produced. The do not possess a relief produced by grinding or a relief angle i.e., they are not designed as a relief surface as seen in FIG. 5, and are not relieved in position as seen in FIG. 5. The pitch a is in the range of 10 to 80 μm. The guide edge 26 between the respective guide flank 25 and the machining surface 24a is a non-cutting edge 26 without cutting ability.

As opposed to this, the opposite edge—illustrated on the right in FIG. 3—which is allocated to the flank 16 that is to be produced, is an efficiently cutting edge i.e., a flank cutting edge 27a to 27f—at least in the vicinity of the respective pitch $\underline{a}$. Allocated to the flank cutting edge 27a to 27f, the broach cutting tooth 21a to 21f has a flank relief surface 28a to 28f formed by a relief angle or a relief produced by grinding—as seen in FIG. 5. In the exemplary embodiment according to FIGS. 3 to 5, the flank pitch b is negative i.e., the flank cutting blades 27a to 27f stand back from the broached flank 16 as the depth of the profile progresses, with $-2 \mu m \leqq b < 0$ applying.

As seen in FIG. 4, where only three broach cutting teeth 21a, 21b and 21c are illustrated, the respective bottom cutting blade 23a to 23c serves to broach a chip 29 that corresponds to the pitch $\underline{a}$. As seen in FIG. 5, the guide flanks 25a to 25c, by the respective guide edge 26, rest over their full length and without any flank pitch on the flank 15 that is to be produced. The chip 29, and thus also the flank 15, is formed in the vicinity of the pitch $\underline{a}$. As the flank pitch b is negative in the embodiment of FIGS. 3 to 5, the flank cutting blades 27b and 27c no longer rest on the flank 16 that is to be produced i.e., they do not machine the final flank 16. This embodiment is suitable in particular for a twist broach, the guide flanks of which lag in the direction of twisting so that additional pressure need not be exercised by the flank cutting blades on the guide flanks. In this case, primarily the torsional forces press the respective broach cutting tooth 21a to 21f against the flank 15 that is to be produced so that proper guidance thereon is assured, which again ensures that the produced flank 15 corresponds to the desired profile. The chip 29 is formed on the portion, belonging to the respectively active pitch $\underline{a}$, of the flank cutting blades 27a to 27f.

At the end of the broaching operation by the broaching portion 4, the flank 15 has been cut to final shape, whereas the flank 16 of the profile 12 has still not been finished. This takes place by means of the sizing portion 5 which has unilaterally cutting teeth 30a to 30d.

Figure 8:
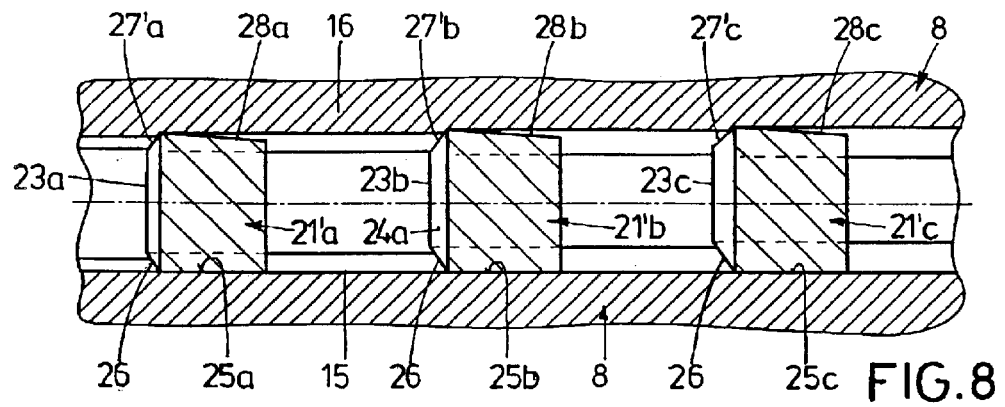
FIG. 8 is a partial cross section through the second embodiment on the line VIII—VIII of FIG. 7.
Figure 7:
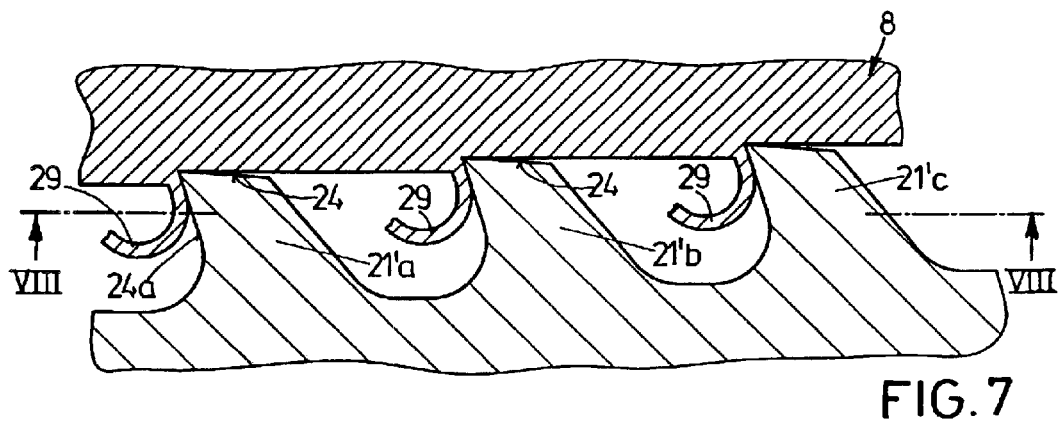
FIG. 7 is a partial longitudinal section of the second embodiment.
Figure 6:
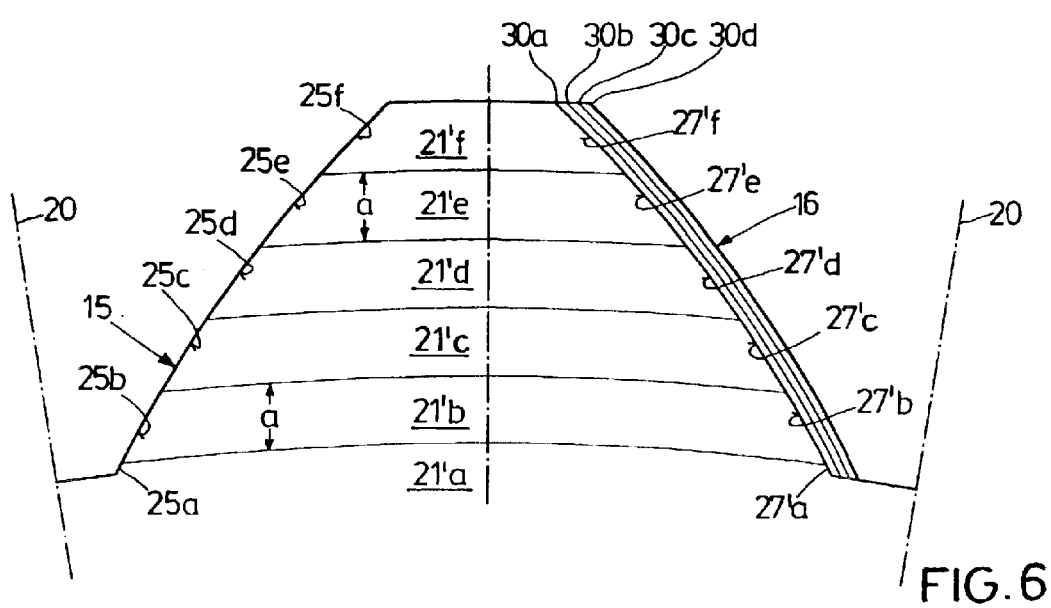
FIG. 6 is a partial cross section of a second embodiment of a broach in engagement with the work piece.

In the second embodiment according to FIGS. 6 to 8, identical parts have the same reference numerals as in the above embodiment. In as much as the parts function identically but differ in construction, the same reference numerals are used provided with a prime.

This second embodiment differs from the one specified above by the course of the flank cutting blades 27'a to 27'f of the broach cutting teeth 21'a to 21'f. They are full size cutting, having no flank pitch; the flank pitch is zero. The flank cutting blades 27'a to 27'b form the chip 29 and the flank 16 along the area of a pitch $\underline{a}$. The course of the flank cutting blades 27'a to 27'f is precisely parallel to the course of the flank 16. Broaching to size takes place by means of the sizing teeth 30a to 30d over the full depth of the profile.

Figure 11:
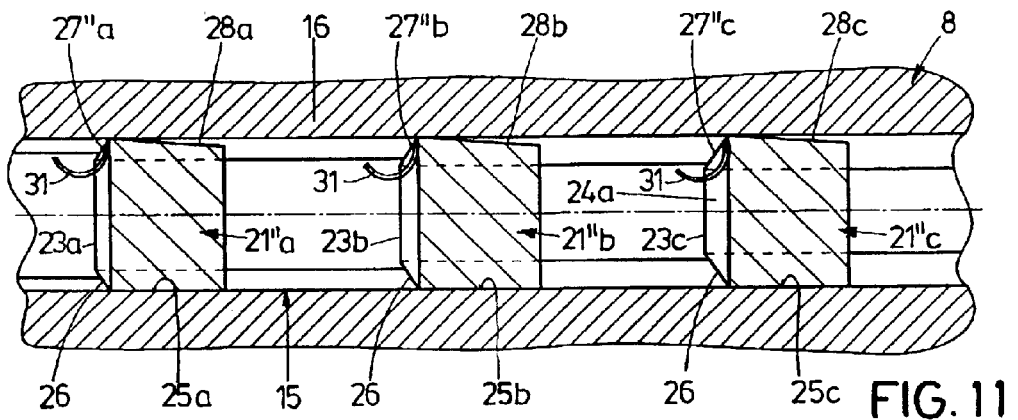
FIG. 11 is a partial cross section of the third embodiment on the line XI—XI of FIG. 10.
Figure 10:
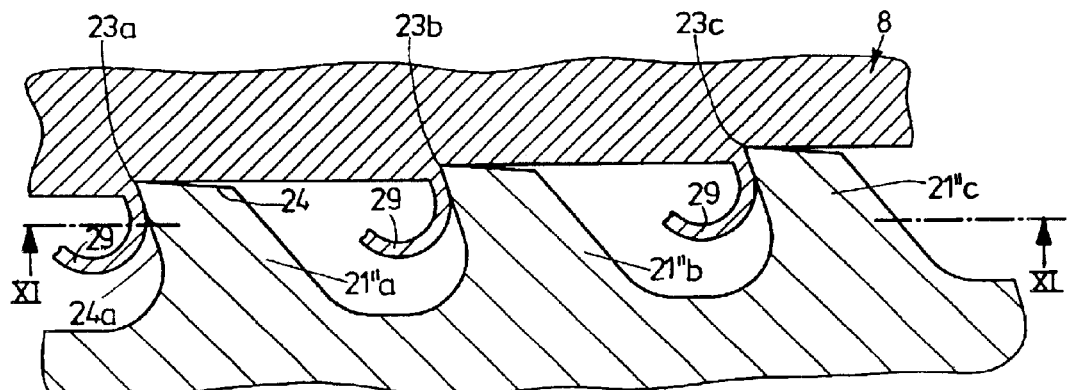
FIG. 10 is a partial longitudinal section of the third embodiment.
Figure 9:
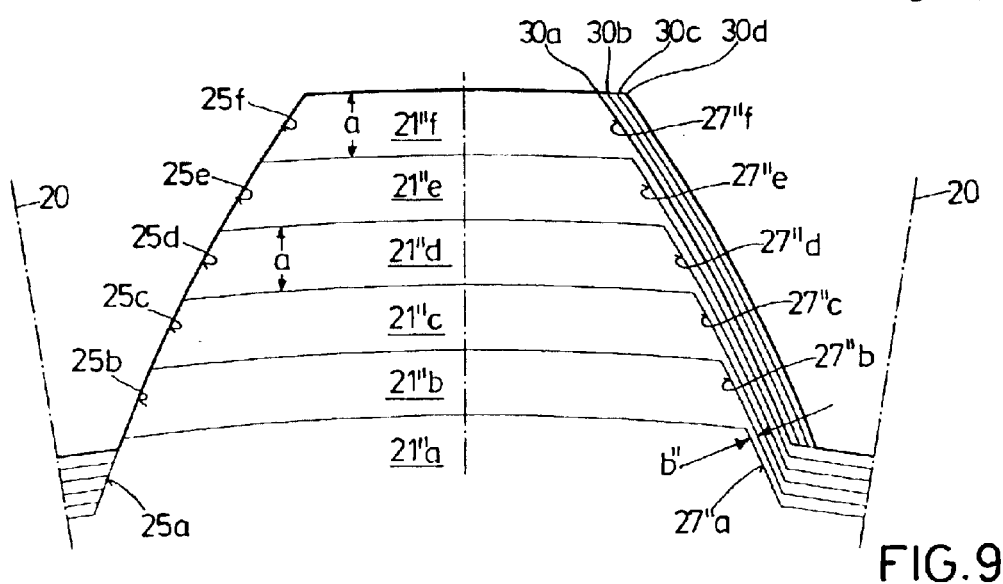
FIG. 9 is a partial cross section of a third embodiment of a broach in engagement with the work piece.

In the third embodiment according to FIGS. 9 to 11, parts that are identical to the mentioned embodiments have identical reference numerals, whereas parts that are functionally identical but differ in construction have the same reference numerals provided with a double prime. In this case, the flank cutting blades 27"a to 27"f are full size cutting blades. The successive broach cutting teeth 21"a to 21"f have a positive flank pitch b", to which $0 < b' \leqq 2$ μm applies. The flank cutting blades 27"a to 27"f cut a chip 31 over the profile depth that has been machined in each case. This is followed by a broaching-to-size operation of this flank 16, which is however not absolutely necessary. Flank full size cutting, as illustrated for the flank 16 in the embodiment of FIGS. 9 to 11, has been described in U.S. Pat. No. 5,865,569 for the job of simultaneously cutting both flanks.

Figure 13:
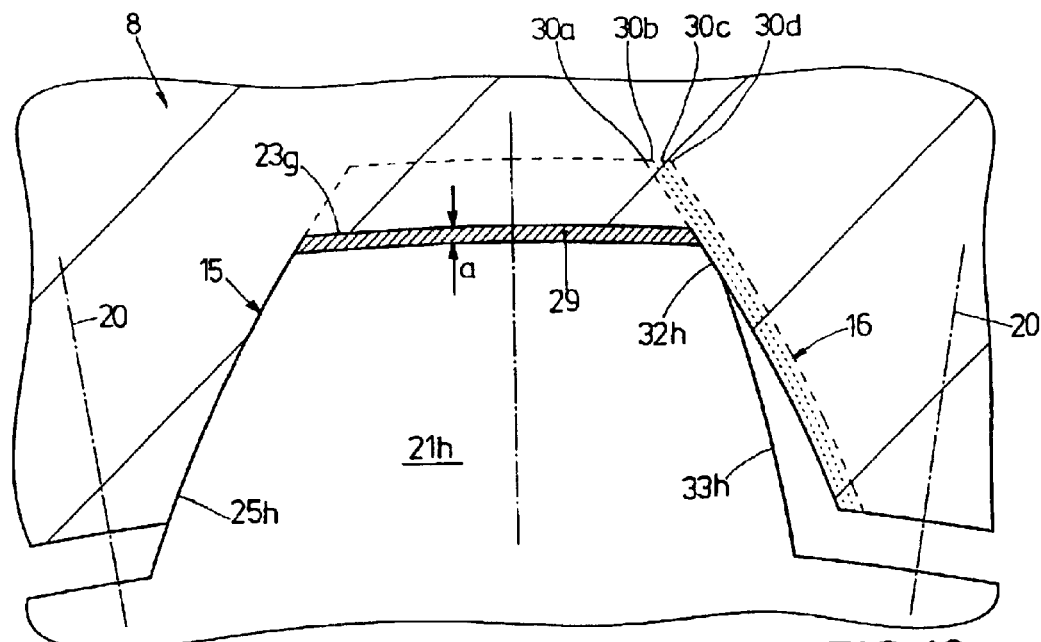
FIGS. 12 to 15 are illustrations of two modified embodiments of the first embodiment.
Figure 12:
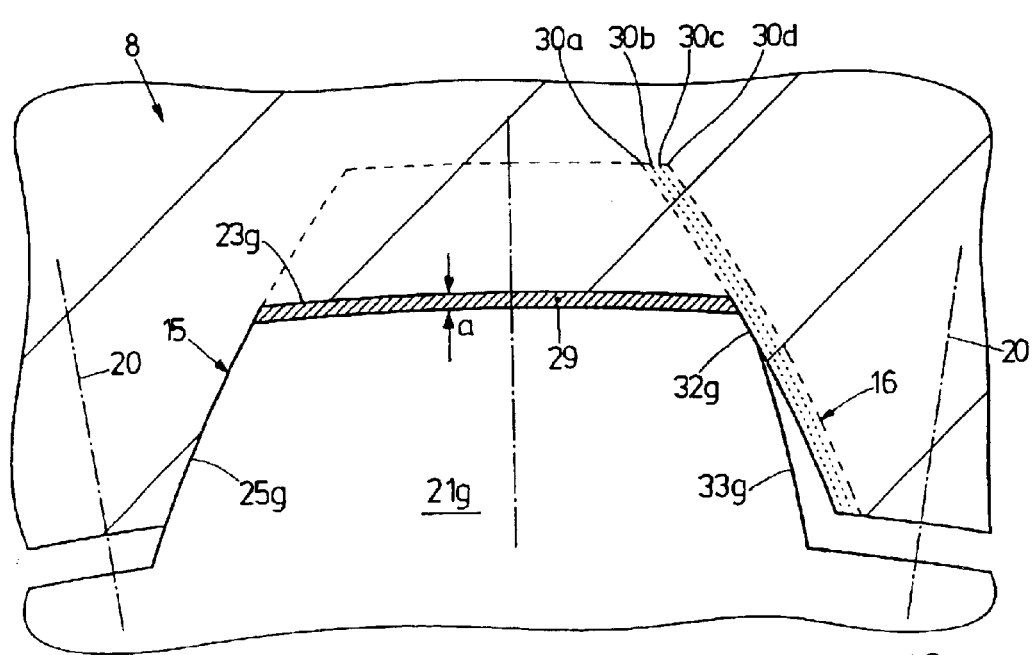
Figure 15:
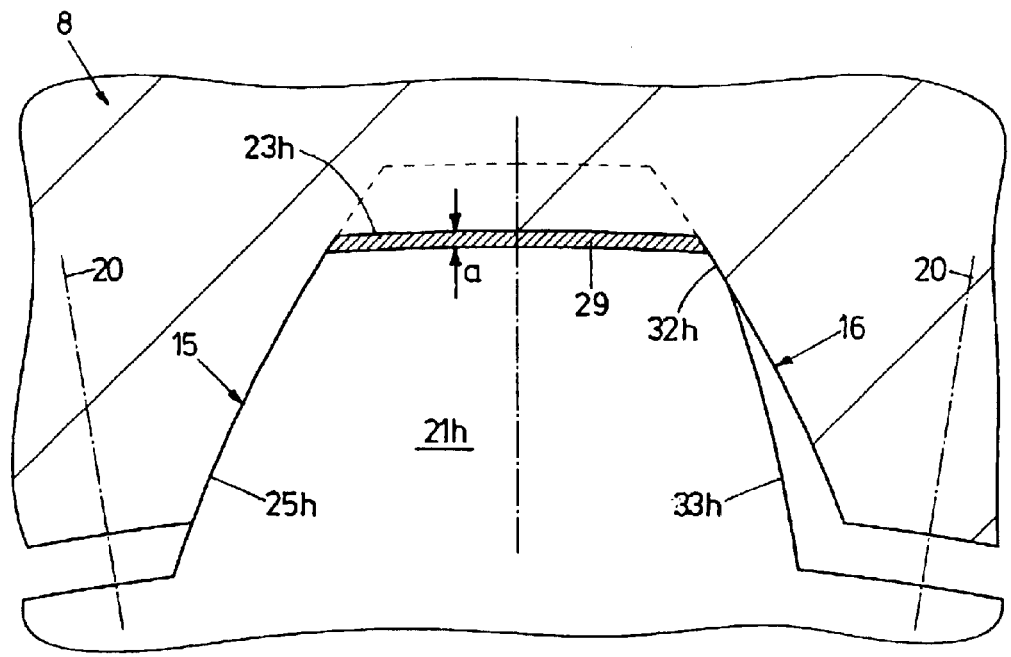
Figure 14:
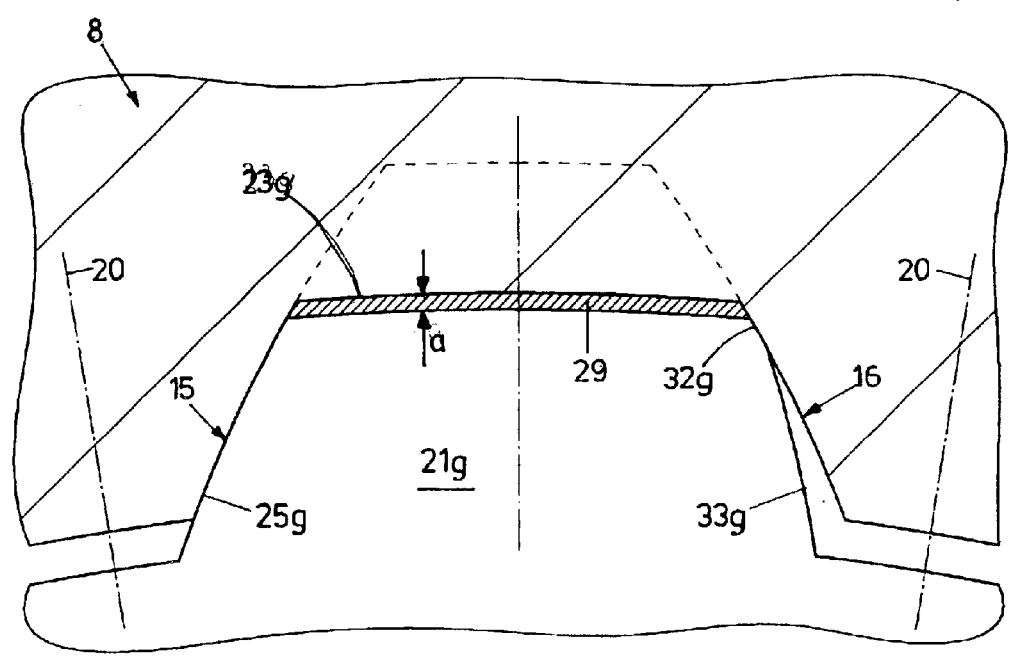

FIGS. 12 and 13 on the one hand and FIGS. 14 and 15 on the other illustrate two broach cutting teeth 21g and 21h, with the represented pitch $\underline{a}$ being comparatively close to reality. The thickness $\underline{a}$ of the chip 29 cut by the respective bottom cutting blade 23g and 23h becomes apparent from the corresponding, densely hatched area. The guide flank 25g and 25h rests full-face on the flank 15 that is to be produced.

In modification of the first embodiment according to FIGS. 3 to 5, FIGS. 12 and 13 illustrate that the side, provided with a flank cutting blade of cutting ability, of the respective broach cutting teeth 21g, 21h has a partial flank cutting blade 32g, 32h only over the depth of some few pitches $\underline{a}$. Therebehind, these sides are relieved surfaces 33g, 33h i.e., they are not covered by the desired flanks 16 that are to be produced; they do not engage with the work piece 8. FIGS. 14 and 15 illustrate a case in which also the flank 16 is broached to size by the broach cutting teeth 21, there being no need for final sizing. As opposed to that, the flank 16 of the embodiment according to FIGS. 12, 13 is finished by sizing. Relieving reduces the risk of clamping in the same way as the relief produced by grinding.

What is claimed is:

1. An internal broach for internally broaching profiles (12), defined by a bottom (14) and first and second flanks (15, 16), of female serrations of a work piece (8), which broach comprises a shank (1), which leads in a direction of broaching (22); and a toothed section (2) with several rows (6) of broach cutting teeth (21a to 21f), the rows (6) being disposed successively counter to the direction of broaching (22);

wherein broach cutting teeth (21a to 21f) are allocated to each other for broaching a profile (12) of a depth;

wherein the broach cutting teeth (21a to 21f) have bottom cutting blades (23a to 23f) and first and second sides;

wherein the bottom cutting blades (23a to 23f) of successive and associated broach cutting teeth (21a to 21f) have a pitch relative to the broach cutting teeth (21a to 21f) which lead in the direction of broaching (22);

wherein a bottom-cutting-blade relief surface (24) is allocated to the bottom cutting blades (23a to 23f); and wherein the first and second sides pass through the bottom-cutting-blade relief surfaces (24) and form first and second edges;

wherein the first sides are guide flanks (25a to 25f) which have no relief or relief angle, whereby the first edges are the first flanks (15) forming guide edges without cutting ability and wherein the second sides, at least in proximity to bottom cutting blades (23a to 23f), are flank-cutting-blade relief surfaces (28a to 28f), the second edges, by allocation to the bottom cutting blades (23a to 23f), being flank cutting blades (27a to 27f) with cutting ability.

2. An internal broach according to claim 1, wherein a part, extending over at least five pitches, of the flank cutting blades of successive and associated broach cutting teeth (21g, 21h) is designed as partial flank cutting blades (32g, 32h) subsequent to the bottom cutting blades (23g, 23h); and wherein the asides, subsequent to the partial flank cutting blades (32g, 32h), of the broach cutting teeth (21g, 21h) are relieved surfaces (33g, 33h).

3. An internal broach according to claim 1, wherein the guide edges (26) of successive broach cutting teeth (21a to 21f) have no flank pitch.

4. An internal broach according to claim 1, wherein the flank cutting blades (27a to 27f) of successive broach cutting teeth (21a to 21f) have a negative flank pitch b.

5. An internal broach according to claim 4, wherein −2 $\mu$m$\leqq$b<0 applies to the negative flank pitch b.

6. An internal broach according to claim 1, wherein the flank cutting blades (27′a to 27′f) of successive broach cutting teeth (21a to 21f) do not have a flank pitch.

7. An internal broach according to claim 1, wherein the flank cutting blades (27″a to 27″f) of successive broach cutting teeth (21a to 21f) have a position flank pitch b″.

8. An internal broach according to claim 7, wherein 2 $\mu$m$\geqq$b>0 applies to the positive flank pitch b″.

9. An internal broach according to claim 1, wherein the toothed section (2) is equipped with sizing teeth (30a to 30d) which are designed for sizing only on the side allocated to the second edges.

\* \* \* \* \*